(12) United States Patent
Hulicsko (10) Patent No.: US 8,291,994 B2
(45) Date of Patent: Oct. 23, 2012

(54) FOLDING LAND ROLLING IMPLEMENT

(76) Inventor: Les Hulicsko, Regina (CA)

( * ) Notice: Subject to any disclaimer, the term of this patent is extended or adjusted under 35 U.S.C. 154(b) by 0 days.

(21) Appl. No.: 12/479,344

(22) Filed: Jun. 5, 2009

(65) Prior Publication Data

US 2010/0307780 A1 Dec. 9, 2010

(51) Int. Cl.
*A01B 49/00* (2006.01)
(52) U.S. Cl. .................. 172/311; 172/452; 172/662
(58) Field of Classification Search .......... 172/310, 172/311, 456, 520, 170, 171, 172, 174, 175, 172/184, 185, 187, 518, 536, 537, 539, 551
See application file for complete search history.

(56) References Cited

U.S. PATENT DOCUMENTS

| | | | | | |
|---|---|---|---|---|---|
| 96,513 | A | * | 11/1869 | Uehling | 404/125 |
| 182,044 | A | * | 9/1876 | Ufford | 404/125 |
| 454,098 | A | * | 6/1891 | West | 172/170 |
| 2,828,597 | A | * | 4/1958 | Moore | 172/626 |
| 3,548,954 | A | * | 12/1970 | Lindemann | 172/311 |
| 3,960,221 | A | * | 6/1976 | Blair et al. | 172/311 |
| 4,042,045 | A | * | 8/1977 | Hake | 172/311 |
| 4,088,346 | A | * | 5/1978 | Schreiner et al. | 280/656 |
| 4,117,892 | A | * | 10/1978 | Dietrich et al. | 172/311 |
| 4,126,187 | A | * | 11/1978 | Schreiner et al. | 172/311 |
| 4,127,283 | A | * | 11/1978 | Baden | 172/248 |
| 4,236,583 | A | * | 12/1980 | Geurts | 172/266 |
| 4,236,585 | A | * | 12/1980 | Adee et al. | 172/587 |
| 4,338,872 | A | * | 7/1982 | Decker | 111/56 |
| 4,360,215 | A | * | 11/1982 | Nohl et al. | 280/413 |
| 4,496,004 | A | * | 1/1985 | Frase et al. | 172/311 |
| 4,502,545 | A | * | 3/1985 | Couser | 172/311 |
| 4,660,651 | A | * | 4/1987 | Pfenninger et al. | 172/311 |
| 4,993,499 | A | * | 2/1991 | Bourgault et al. | 172/294 |
| 5,029,757 | A | * | 7/1991 | Bourgault et al. | 239/167 |
| 5,191,942 | A | * | 3/1993 | Bussiere | 172/286 |
| 5,660,237 | A | * | 8/1997 | Boyko et al. | 172/311 |
| 5,829,370 | A | * | 11/1998 | Bender | 111/54 |
| 6,119,788 | A | * | 9/2000 | Bernier | 172/311 |
| 6,119,792 | A | * | 9/2000 | Almer | 172/799.5 |
| 6,561,283 | B2 | * | 5/2003 | Hundeby | 172/459 |
| 2008/0314605 | A1 | * | 12/2008 | Degelman et al. | 172/311 |

FOREIGN PATENT DOCUMENTS

EP 399914 A1 * 11/1990

* cited by examiner

*Primary Examiner* — Jamie L McGowan
(74) *Attorney, Agent, or Firm* — Patterson Thuente Christensen Pedersen P.A.

(57) ABSTRACT

A land roller implement has a center frame and a center roller. Wings are pivotally mounted to a wing bracket pivotally mounted to, and extending rearward from, each side of the center frame. The wings and center frame thus move independently up and down when operating. The bracket is locked and wheels mounted on the brackets move the rollers up for transport. Inner and outer rollers on each wing are aligned and separated by a roller spacing. An overlap roller rolls over theis spacing. In transport position the right and left wings extend rearward from the center frame and right and left overlap rollers are aligned with, and adjacent to, each other. During a turn, the wings pivot and move closer to each other. To avoid contact with each other the right and left overlap rollers move forward and rearward to offset positions.

18 Claims, 7 Drawing Sheets

FOLDING LAND ROLLING IMPLEMENT

This invention is in the field of agricultural implements and in particular a folding land rolling and packing implements.

BACKGROUND

Land rollers or packers are used in agriculture to pack seed, level land, push rocks down into the soil, break up clods, and for like purposes. What are commonly called land rollers comprise a fairly large diameter cylindrical steel roller rotatably mounted to a frame such that the rotational axis of the roller is oriented perpendicular to the operating travel direction. Land packing implements comprise a packing element with a generally cylindrical shape that may be defined by a coil as in FIG. 12 of U.S. Pat. No. 4,896,732 to Stark, or by a series of packer wheels mounted close together on a common shaft as in FIG. 1 of the Stark patent. For convenience both rollers and packers will be referred to hereafter as land rollers or land rolling implements.

These rollers have a relatively low draft since they are not engaging the soil but simply rolling over the soil. Thus it is possible for common agricultural tractors to tow a very wide implement. In order to follow the ground satisfactorily, and to allow the implement to be placed in a transport position, land rolling implement include a plurality of roller sections mounted on the frame of the implement, such as disclosed for example in the Stark patent, and in U.S. Pat. No. 6,119,788 to Bernier.

In order to provide complete coverage of the field it is desirable to have the roller sections overlap each other. In the implement illustrated in FIG. 3 of Stark, a center roller section is mounted rearward of right and left wing roller sections. The sections are oriented such that the outer ends of the following center frame overlap the inner ends of the wing sections. Similarly in the implement disclosed in FIG. 3 of Bernier the center section is mounted forward of the right and left wing roller sections. The sections are oriented such that the inner ends of the following wing sections overlap the outer ends of the center section. The wings fold into alignment with the travel direction for transport.

To provide a wider implement, Stark also discloses in FIGS. 12-17 a 5 section roller implement. In this outer wing sections are added to the outer ends of the inner wing sections of FIG. 3 at a location rearward of the inner wings and with their rotational axes aligned generally with that of the center section. The 5 section implement is shown in transport as well with the outer and inner wing sections generally aligned in the travel direction and located side by side. As the width and number of sections increases, placing the sections in a transport position becomes problematic.

SUMMARY OF THE INVENTION

It is an object of the present invention to provide land rolling and packing implements that overcome problems in the prior art.

In a first embodiment the present invention provides a land roller implement apparatus comprising a center section comprising a frame, a hitch at a front end of the center frame adapted for attachment to a towing vehicle, and a center roller rotatably mounted to the center frame about a center roller axis oriented substantially perpendicular to an operating travel direction. The center frame also comprises right and left wing brackets extending rearward from corresponding right and left locations on the center frame. Each wing bracket is pivotally attached at a front end thereof to the center frame about a bracket axis oriented substantially horizontal and perpendicular to the operating travel direction. A center wheel is movably mounted under each wing bracket. A wing is pivotally mounted to each wing bracket about a substantially vertical transport axis and about a pivot axis oriented substantially horizontal and perpendicular to the wing roller axis, each wing comprising at least one wing frame and a wing roller rotatably mounted to the at least one wing frame about a wing roller axis. A bracket lock is operative when engaged to lock the wing bracket with respect to the bracket axis to prevent rotation of the wing bracket about the bracket axis. Right and left transport actuators are operative to move right and left center wheels down such that, when the transport locks are engaged, right and left wing brackets move up to a transport position. Right and left wing wheels are movable from a raised operating position above the ground to a lowered transport position supporting corresponding right and left wings above the ground. Right and left wings are movable from an operating position with the center and wing rollers resting on the ground, and extending laterally from corresponding right and left wing brackets such that the wing roller axes are substantially perpendicular to the operating travel direction and such that inner ends of right and left wing rollers are rearward of and overlap corresponding right and left ends of the center roller, to a transport position with the center and wing rollers supported above the ground and where the right and left wings extend rearward from the corresponding right and left wing brackets such that the wing roller axes are substantially aligned with the operating travel direction.

In a second embodiment the present invention provides a land roller implement apparatus comprising a center frame, a hitch at a front end of the center frame adapted for attachment to a towing vehicle, and a center roller rotatably mounted to the center frame about a center roller rotational axis oriented substantially perpendicular to an operating travel direction. Center wheels are mounted on the center frame and are movable from a raised operating position to a lowered transport position supporting the center roller above the ground for movement in the operating travel direction. Right and left wings are pivotally mounted to corresponding right and left sides of the center frame, each wing comprising an inner wing frame pivotally mounted to a corresponding end of the center frame, and an inner roller rotatably mounted to the inner wing frame about an inner roller axis, and an outer wing frame pivotally mounted, about a wing pivot axis oriented substantially horizontally and perpendicular to the inner roller axis, to a corresponding end of the inner wing frame, and an outer roller rotatably mounted to the outer wing frame about an outer roller axis. The inner and outer rollers are substantially aligned and adjacent ends of the inner and outer rollers are separated by a roller spacing. An overlap frame is attached to a rear portion of one of the inner and outer wing frames, and an overlap roller is rotatably mounted to the overlap frame about an overlap roller axis. The overlap roller is oriented to roll over the roller spacing. The right and left wings are movable from an operating position with the rollers resting on the ground, where the right and left wings extend laterally from the corresponding right and left ends of the center frame such that the inner, outer, and overlap roller axes are substantially perpendicular to the operating travel direction and such that inner ends of the right and left inner rollers are rearward of and overlap corresponding right and left ends of the center roller, to a transport position with the rollers supported above the ground where the right and left wings extend rearward from the corresponding right and left ends of the center frame such that the inner, outer, and overlap roller axes are substantially aligned with the operating travel direction. In the transport position right and left overlap rollers are laterally aligned with, and adjacent to, each other when moving in a substantially straight line in the operating travel direction. During a turn, the right and left wings pivot with respect to the center frame about substantially vertical transport pivot axes such that a distance between the right and left wings is reduced, and such that the right and left overlap rollers move forward and rearward to offset positions with respect to each other such that the right and left overlap rollers can move toward the corresponding opposite right and left wings.

Thus the present invention provides an implement for rolling or packing a field surface that can be very wide while providing a compact transport width with the wings aligned behind the center section such that a width of the apparatus when in the transport position is substantially equal to a width of the center section. Where the implement is a land roller, the rollers are typically about 42 inches in diameter and the width can be 85 feet with a transport width of 12.5 feet which will allow same to be transported on public roads without pilot vehicles in many jurisdictions. The implement of the invention provides a plurality of sections that can move independently to follow ground contours, and moves readily between transport and field operating positions. It is contemplated that wider implements could have three, four, or more separate frames and rollers in each wing.

In transport the overlap rollers are close together and as is known in the art when such a winged implement makes a turn, the wings pivot and move closer to each other. The apparatus of the invention is configured so that to avoid contact with each other the right and left overlap rollers move forward and rearward to offset positions as one side of the center frame moves forward with respect to the other side pulling one wing forward with respect to the other wing, and thus moving the overlap rollers to the offset positions.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

FIGS. 1-9 illustrate an embodiment of a land roller implement apparatus 1 of the present invention. The apparatus 1 comprises a center section comprising a center frame 3, a hitch 5 at a front end of the center frame 3 adapted for attachment to a towing vehicle, and a center roller 7 rotatably mounted to the center frame 3 about a center roller rotational axis CRA oriented substantially perpendicular to an operating travel direction T. Center wheels 9 mounted on the center frame 3 are movable from a raised operating position to a lowered transport position supporting the center roller 7 above the ground for movement in the operating travel direction T.

Right and left wings 11R, 11L are pivotally mounted to corresponding right and left sides of the center frame 3. Each wing 11 comprises inner, outer, and extension, wing frames. The inner wing frame 13 is pivotally mounted to a corresponding side of the center frame 3, and an inner roller 15 is rotatably mounted to the inner wing frame 13 about an inner roller axis IRA. In the illustrated apparatus 1 the inner wing frame 13 is pivotally mounted to the center frame 3 by a universal joint 14 such that the inner wing frame 13 can pivot with respect to the center frame 3 both up and down about a horizontal axis HA to follow ground contours, and forward and rearward about a vertical axis VA to move from transport to operating positions as described below. The center frame 3 comprises rearward extending wing brackets 16 and the universal joint 14 is mounted on the wing bracket 16. Thus the inner ends of the right and left inner rollers 15 can be located rearward of and overlapping corresponding right and left ends of the center roller 7.

Figure 3:
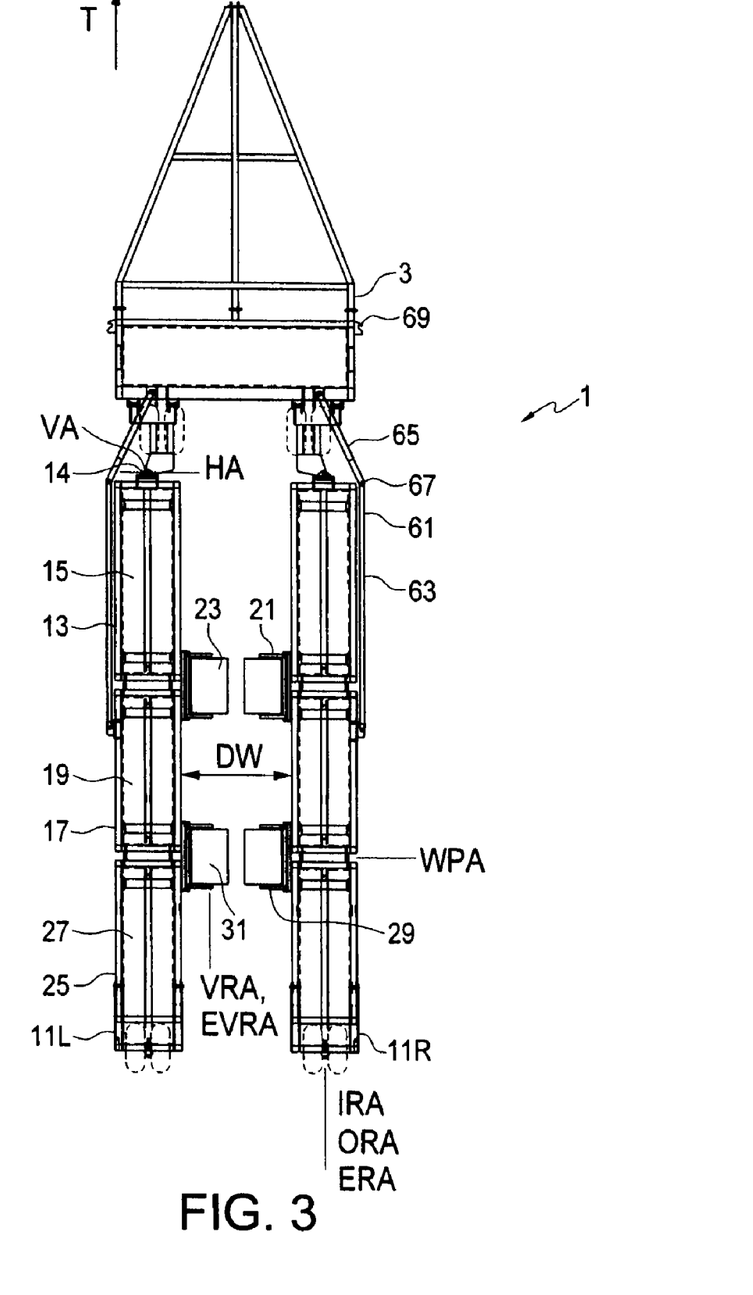
FIG. 3 is a top view of the embodiment of FIG. 1 in the transport position moving straight in the operating travel direction.

The vertical transport axis VA is located such that when the wings 11 pivot rearward to the transport position of FIG. 3, the wings 11 are inside the path of the center section and thus in transport the implement is only as wide as the center section.

Figure 5:
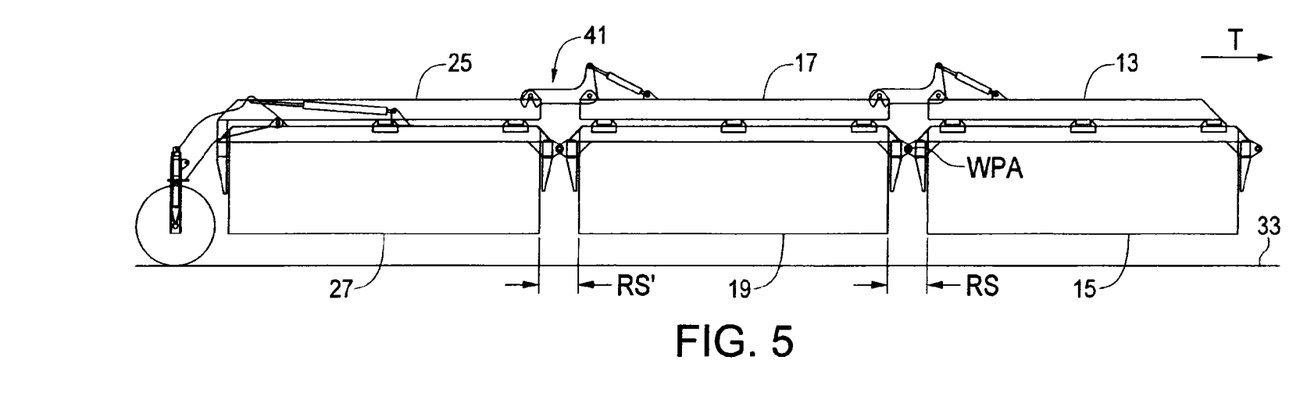
FIG. 5 is a side view showing a wing of the embodiment of FIG. 1 in the raised transport position.

The outer wing frame 17 is pivotally mounted, about a wing pivot axis WPA oriented substantially horizontally and perpendicular to the inner roller axis IRA, to a corresponding end of the inner wing frame 13, so the inner and outer wing frames 13, 17 can pivot up and down about with respect to each other about the wing pivot axis WPA to follow ground contours. An outer roller 19 is rotatably mounted to the outer wing frame 17 about an outer roller axis ORA. The inner and outer rollers 15, 19 are substantially aligned and adjacent ends of the inner and outer rollers 15, 19 are separated by a roller spacing RS, as best seen in FIG. 5. The spacing allows the ends of the rollers to tilt toward each other without touching.

An overlap frame 21 is attached to a rear portion of one of the inner and outer wing frames 13, 17 and extends alongside the other of the inner and outer wing frames 13, 17. Thus the overlap frame 21 is essentially an extension of the frame to which it is attached, which could be either of the adjacent frames. An overlap roller 23 is rotatably mounted to the overlap frame 21 about an overlap roller axis VRA is located and oriented to roll over the roller spacing RS.

It is contemplated that narrower embodiments of the invention will have just the inner and outer wing frames and rollers, however the drawings illustrate a wider implement with three frames and rollers in each wing 11. Thus the wings 11 further comprise an extension wing frame 25 pivotally mounted, about a wing pivot axis WPA, again oriented substantially horizontally and perpendicular to the outer roller axis ORA, to a corresponding end of the outer wing frame 19, and an extension roller 27 rotatably mounted to the extension wing frame 25 about an extension roller axis ERA. It is contemplated that each wing 11 could comprise four or even more sections if desired.

The inner, outer, and extension rollers 15, 19, 27 are substantially aligned. Adjacent ends of the outer and extension rollers 19, 27 are again separated by an extension roller spacing RS' which will typically be the same as the spacing RS between the ends of the inner and outer rollers 15, 19 but can be otherwise as well if conditions warrant.

An extension overlap frame 29 is attached to a rear portion of one of the outer and extension wing frames 17, 25, and an extension overlap roller 31 is rotatably mounted to the extension overlap frame 29 about an extension overlap roller axis EVRA, the extension overlap roller 29 oriented to roll over the extension roller spacing RS'.

Figure 1:
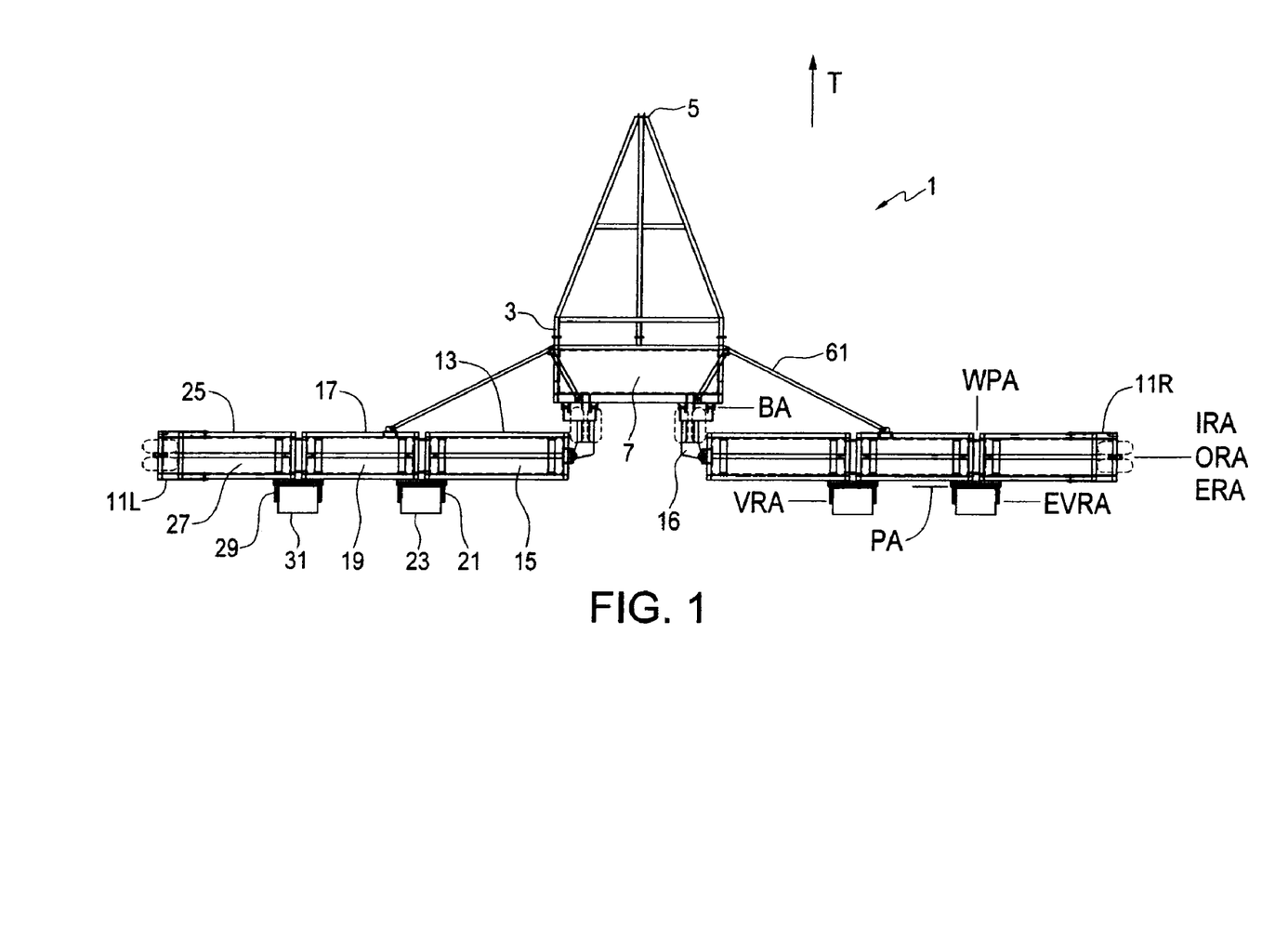
FIG. 1 is a top view of an embodiment of an implement apparatus of the present invention in the field operating position.
Figure 6:
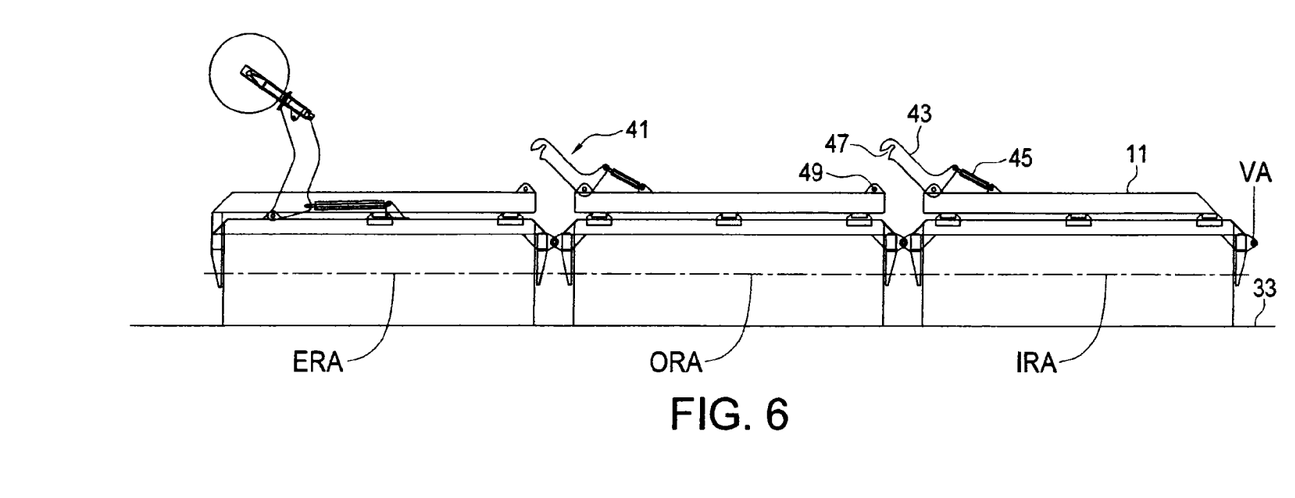
FIG. 6 is a side view showing the wing of FIG. 5 in the lowered operating position.

The right and left wings 11R, 11L are movable from an operating position, illustrated in FIGS. 1 and 6 with the rollers 15, 19, 23, 27, 31 resting on the ground, where the right and left wings 11R, 11L extend laterally from the corresponding right and left sides of the center frame 3 such that the inner, outer, extension, and overlap roller axes IRA, ORA, ERA, VRA, EVRA are substantially perpendicular to the operating travel direction and such that inner ends of the right and left inner rollers 15 are rearward of and overlap corresponding right and left ends of the center roller 7, to a transport position as illustrated in FIGS. 6 and 3 with the rollers 15, 19, 23, 27, 31 supported above the ground 33 where the right and left wings 11R, 11L extend rearward from the corresponding right and left sides of the center frame 3 such that the inner, outer, extension, and overlap roller axes IRA, ORA, ERA, VRA, EVRA are substantially aligned with the operating travel direction T.

In the transport position right and left overlap and extension overlap rollers 23R, 23L 31R, 31L are laterally aligned with, and adjacent to, each other when moving in a substantially straight line in the operating travel direction as illustrated in FIG. 3. Thus the overlap rollers 23R, 23L 31R, 31L are close together and is known in the art when such a winged implement makes a turn, the wings pivot and move closer to each other. The apparatus 1 is configured so that to avoid contact with each other the right and left overlap rollers 23R, 23L 31R, 31L move forward and rearward to offset positions as one side of the center frame 3 moves forward with respect to the other side pulling one wing 11 forward with respect to the other wing 11, and thus moving the overlap rollers 23R, 23L 31R, 31L to the offset positions.

Figure 4:
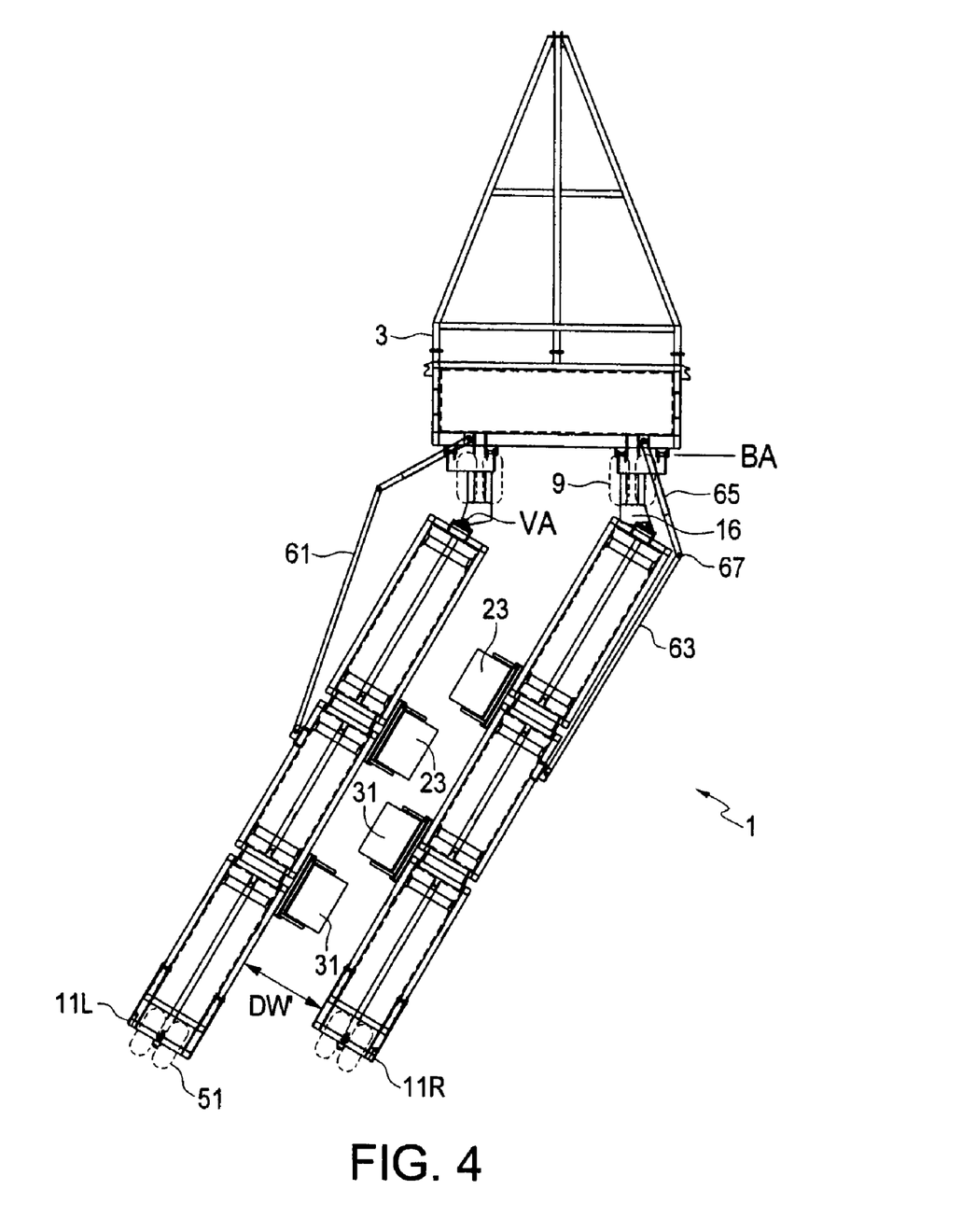
FIG. 4 is a top view of the embodiment of FIG. 1 in the transport position during a turn showing how the overlap rollers move to offset positions with respect to each other to avoid contact.

During a turn as illustrated in FIG. 4 the right and left wings 11R, 11L pivot with respect to the center frame 3 about substantially vertical transport pivot axes VA such that a distance DW between the right and left wings as illustrated in FIG. 3 is reduced to a lesser distance DW' as illustrated in FIG. 4. It can be seen from FIG. 3 that if the distance between the wings 11R, 11L is reduced, the right overlap and extension overlap rollers 23R, 31R would contact the corresponding left overlap and extension overlap rollers 23L, 31L however because of the configuration of the apparatus 1, the right and left overlap and extension overlap rollers 23R, 31R 23L, 31L move forward and rearward to offset positions with respect to each other as illustrated in FIG. 4 such that the right and left overlap and extension overlap rollers 23R, 31R 23L, 31L can move toward the corresponding opposite right and left wings 11R, 11L beside the opposite corresponding overlap roller. As the turn is completed the right and left wings 11R, 11L move to the position of FIG. 3 with distance DW between the wings, and the overlap rollers again move to their adjacent positions which are accommodated by the distance DW between the right and left wings 11R, 11L.

Figure 7:
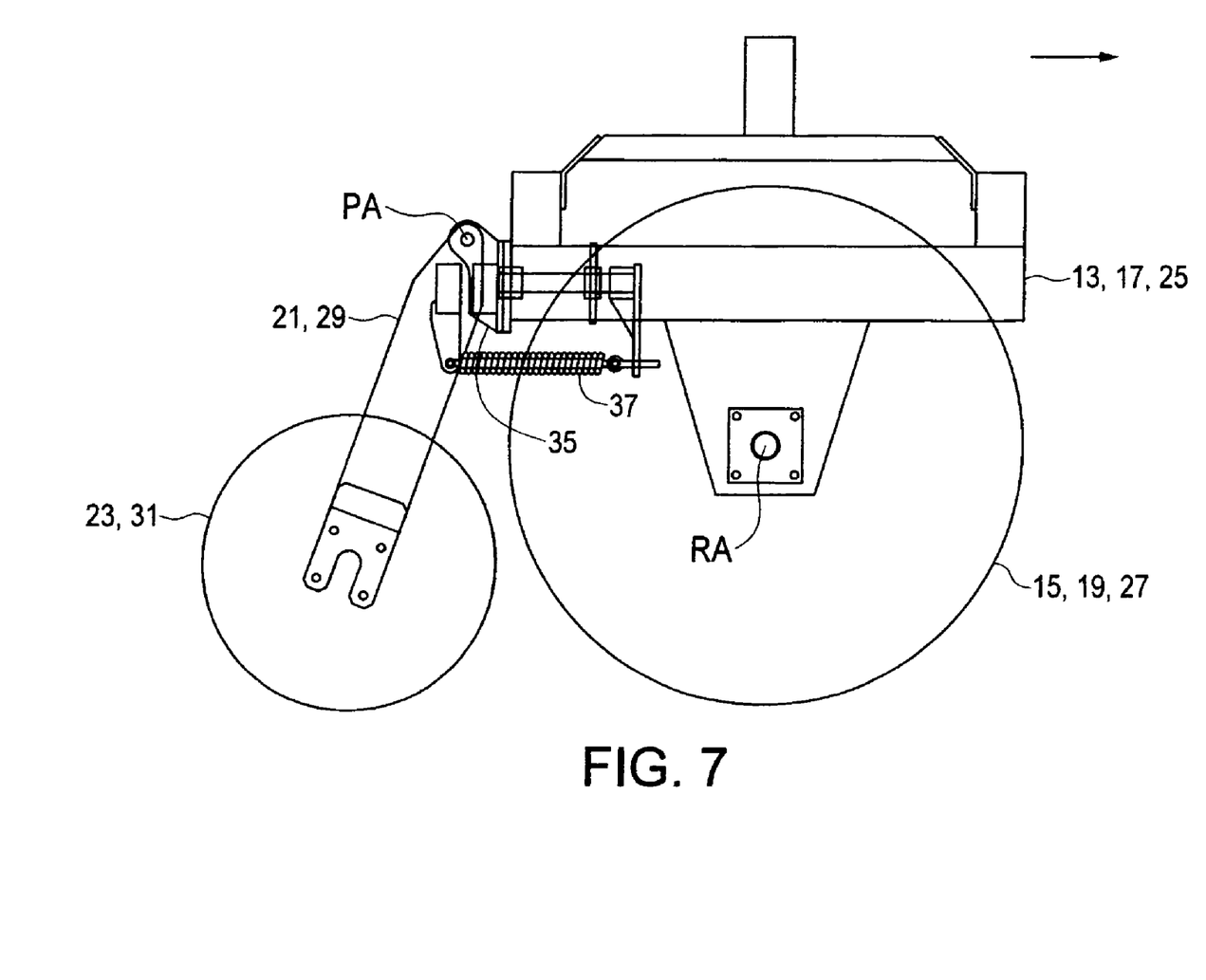
FIG. 7 is a schematic side view illustrating the attachment of the overlap frame and roller in the embodiment of FIG. 1.

As illustrated in FIG. 7, the overlap rollers 23, 31 have a diameter that is substantially less than a diameter of the inner, outer, and extension rollers 15, 19, 27. The overlap frames 21, 29 are mounted about a pivot axis PA oriented substantially parallel to a rotational axis RA of a corresponding roller mounted to the inner, outer, and extension wing frames 13, 17, 25 such that an attached overlap roller 23, 31 can move up over an obstruction. A lower stop 35 is provided such that when a wing is raised to the transport position to raise the inner, outer, and extension rollers 15, 19, 27 up above the ground, the attached overlap rollers 23, 31 are also raised above the ground. A bias element, such as spring 37, is operative to exert a downward bias force on the overlap frame 21, 29, thereby transferring some weight from the larger heavier rollers to the smaller lighter overlap rollers to increase the force exerted thereby on the ground.

FIGS. 5 and 6 illustrate wing locks 41 operative to lock the inner, outer, and extension wing frames 13, 17, 25 in an aligned position as illustrated in FIG. 6 where the inner and outer roller axes are substantially aligned. The illustrated wing locks 41 are provided by pivot arms 43. The pivot arms 43 are raised when the apparatus 1 is in the operating position of FIG. 6 so that the inner, outer, and extension wing frames 13, 17, 25 can pivot about the wing pivot axes WPA with respect to each other and the attached rollers can follow ground contours. To place the wing frames 13, 17, 25 in an aligned position for transport, the pivot arms 43 are moved down by hydraulic cylinders 45 such that tapered grooves 47 in the pivot arms 43 engage pins 49 in the adjacent frame and as the pivot arm 43 is forced downward the pin 49 is forced along the tapered groove to the bottom of the groove 47 where the wing frames 13, 17, 25 are in the aligned position. The wing frames 13, 17, 25 then form essentially a rigid structure that can be carried by a wing wheel 51 on the rear end and by the center wheels 9 at the front end.

Figure 2:
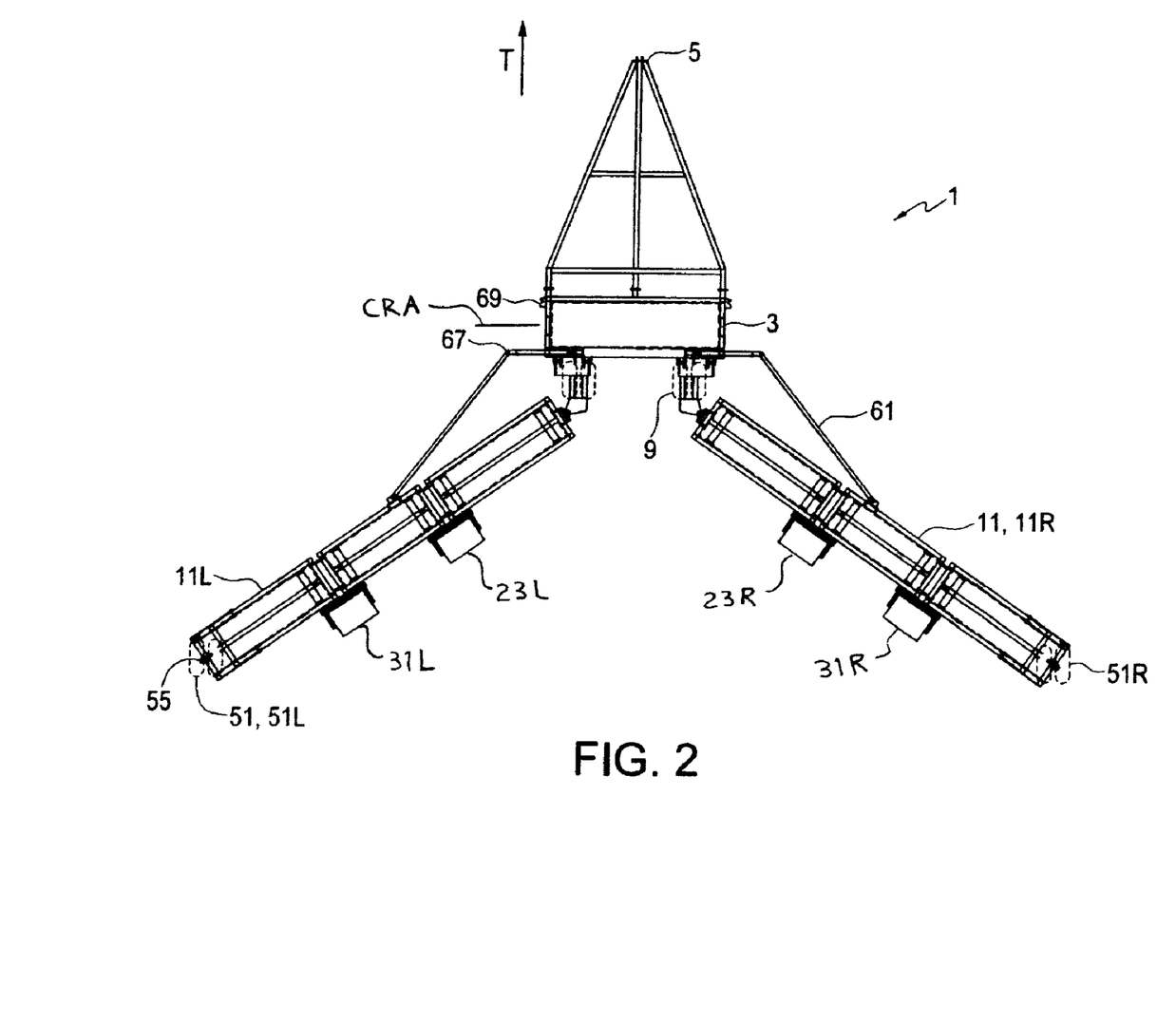
FIG. 2 is a top view of the embodiment of FIG. 1 in an intermediate position between operating and transport positions.

The illustrated apparatus 1 has a wing wheel 51 mounted at an outer location on the extension wing frame 27 that is movable from a raised operating position, as illustrated in FIG. 6, to a lowered transport position as illustrated in FIG. 5 where the wing wheel 51 is operative to support the wing 11 for travel in the operating travel direction T. The illustrated wing wheel 51 is pivotally mounted to the extension wing frame 27 about a substantially vertical wheel pivot axis. A wheel actuator 55 is operative to pivot the wing wheel about the vertical wheel pivot axis VA, as illustrated in FIG. 2.

In the transport position of FIG. 3, the wings 11 are oriented in alignment with the operating travel direction T extending rearward, and the rotational plane of each wing wheel 51 is aligned with the corresponding wing 11 and with the operating travel direction T. When a field location is reached, the actuators 55 are activated to pivot front edges of the wing wheels 51 outward, such that the front edge of the right wing wheel 51R moves to the right and the front edge of the left wing wheel 51L moves to the left. The apparatus 1 is moved forward as the wing wheels 51 pivot, and the wings 11 are thus steered outward toward the field position as illustrated in FIG. 2. Depending on the conditions and the implement, the wings 11 will move out through about 65 to 80 degrees to extend laterally from ends of the center frame 3 by simply steering the wing wheels 51.

When this orientation has been achieved, only a relatively small final force urging the wings 11 forward relative to the center frame 3 is required to be exerted to complete the movement of the wings 11 to a field position perpendicular to the operating travel direction T as illustrated in FIG. 1. To exert this final force, the apparatus 1 can be stopped and moved a small distance rearward to move the center frame 3 rearward relative to the wings 11, and thus urge the wings 11 forward relative to the center frame 3, and thereby finish moving the wings 11 to the field position perpendicular to the operating travel direction. Braces or like fasteners can then be attached to maintain the wings in this full field position.

Alternatively, depending on the type of implement, the field conditions, and like factors, the wings 11 may have sufficient momentum that when forward movement of the center frame 3 is stopped, as by applying brakes of the towing tractor, momentum of the wings 11 exerts the final force urging the wings 11 forward relative to the stopped center frame 3 such that the wings 11 continue moving forward to the full field position where they may be fastened.

Once the apparatus 1 is in the operating position, the wing wheels 51 are raised to the transport position illustrated in FIG. 6. They may be returned to the orientation where the rotational plane of each wing wheel 51 is aligned with the corresponding wing 11, as illustrated in FIG. 6. To move from the operating position of FIG. 1 to the transport position of FIG. 3 it is simply necessary to lower the wing wheels 51 to the transport position to raise the rollers 15, 19, 23, 27, 31 above the ground and then tow the apparatus 1 forward. The wings 11 will fall back to the transport position of FIG. 3 with the wing wheels 51 in this position.

The illustrated braces 61 are designed to lie closely adjacent the front edges of the inner wing frames 13 as illustrated in FIG. 3 to minimize the width of the apparatus 1 in the transport position. The braces 61 include a rear member 63 pivotally connected to the outer wing frame 17 at one end and pivotally connected at the opposite end to a front member 65. The opposite end of the front member 65 is pivotally connected to the center frame 3. In the operating position of FIG. 1 the pivotal connection, a pin 67 or the like, between the front and rear members is engaged in a transport bracket 69 fixed to the center frame 3 to brace the wings 11 in the operating position. To move to transport position the pin 67 is released and the braces 11 fall back to the transport position of FIG. 3.

The front member 65 is telescoping so that the length thereof can extend as required to make a turn as illustrated in FIG. 4. The telescoping front member 65 is biased toward its shortest length which is configured so that the pin 67 at the pivotal connection between the front and rear members engages the transport bracket 69 when the wings 11 move forward to the operating position of FIG. 1.

Figure 8:
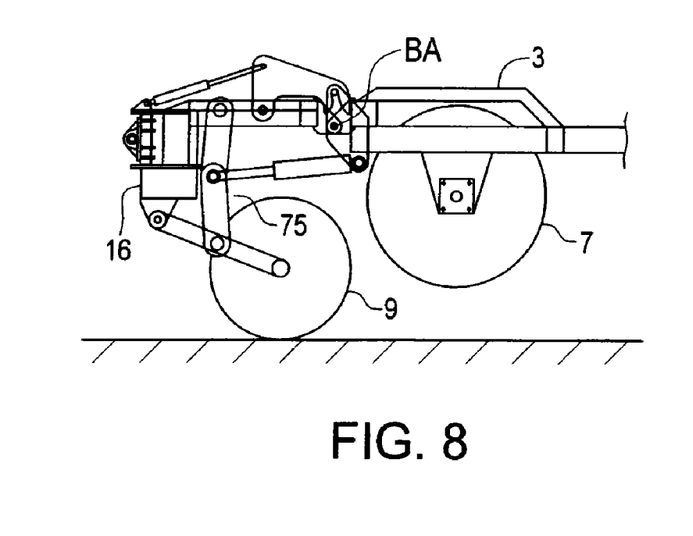
FIG. 8 is a schematic side view showing the wing bracket extending rearward from the center frame, the center wheel movably attached to the wing bracket, and the transport actuator in the transport position.
Figure 9:
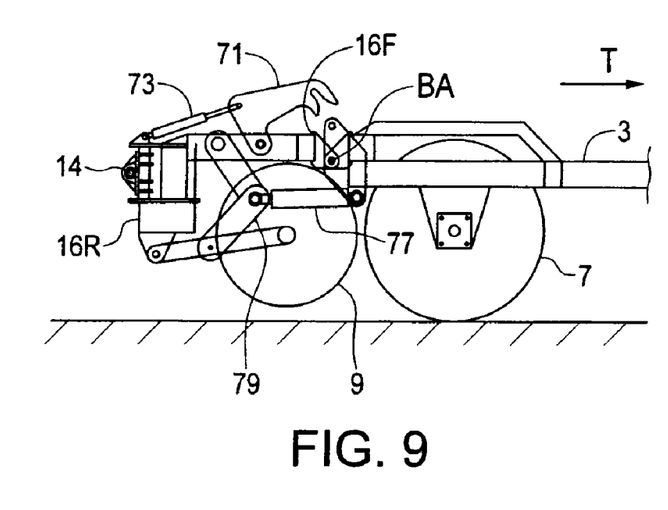
FIG. 9 is a schematic side view showing the wing bracket, center wheel, wing bracket, and transport actuator of FIG. 8 in the operating position.

In order to provide the inner wing roller 15 with increased independence of movement from the center roller 7, the wing brackets 16 can be configured as shown in FIGS. 8 and 9. FIG. 8 shows the transport position and FIG. 9 shows the operating position. Each wing bracket 16 is pivotally attached at a front end thereof to the center frame 3 about a bracket axis BA oriented substantially horizontal and perpendicular to the operating travel direction T. A center wheel 9 is movably mounted under each wing bracket 16. A wing 11 is pivotally mounted to each wing bracket 16 as described above about vertical and horizontal axes by a universal joint 14. A bracket lock 71 is operative when engaged to lock the wing bracket 16 with respect to the bracket axis BA to prevent rotation of the wing bracket about the bracket axis BA. The bracket lock 71 is moved to the engaged position of FIG. 8 or the disengaged position of FIG. 9 by a lock cylinder 73.

A transport actuator 75 is operative to move the center wheel 9 down such that, when the bracket lock 71 is engaged, the wing bracket 16 moves up to a transport position and right and left wing brackets 16 raise the center roller 7 and inner ends of the wings up to transport position, while wing wheels raise the outer ends of the wings as described above, so that all rollers are above the ground and the wings can be moved to the transport position. The illustrated transport actuator 75 comprises an extendable actuator 77 operative to move an over-centering link 79 connected between the center wheel 9 and the wing bracket 16. As illustrated when in the transport position of FIG. 8, the link 79 is in a locked over-centered position which reduces stress on the actuator 77 during transport.

Thus it can be seen that in the operating position of FIG. 9 the center wheel 9 is above the ground and the bracket lock 71 is disengaged so that the wing bracket 16 can pivot freely about the bracket axis BA. The rear end 16R of the wing bracket 16, and thus the inner end of the roller in the frame attached thereto can pivot freely up and down independent of the vertical position of the front end 16F of the wing bracket 16 and the center roller 7. In the prior art the wing was typically attached to a fixed location on the center frame such that the center and wing moved up and down together at the point where same were attached. Ground following is thus improved using the pivotally attached wing bracket 16, and stress on the implement is reduced.

Thus the present invention provides an implement for rolling or packing a field surface where the wings can be aligned behind the center section when in the transport position, such that a width of the apparatus when in the transport position is substantially equal to a width of the center section. The implement thus can be very wide while providing a compact transport width. The implement apparatus of the present invention further provides a plurality of sections that can move independently to follow ground contours, and moves readily between transport and field operating positions.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A land roller implement apparatus comprising:
a center section comprising a center frame, a hitch at a front end of the center frame adapted for attachment to a towing vehicle, and a center roller rotatably mounted to the center frame about a center roller axis oriented substantially perpendicular to an operating travel direction;
the center frame comprising right and left wing brackets extending rearward from corresponding right and left locations on the center frame, wherein each wing bracket is pivotally attached at a front end thereof to the center frame about a bracket axis oriented substantially horizontal and perpendicular to the operating travel direction;
a right center wheel movably mounted under the right wing bracket and a left center wheel movably mounted under the left wing bracket;
a right and left wing, each comprising a wing frame and a wing roller rotatably mounted to the respective wing frame about a wing roller axis, pivotally mounted to each wing bracket about a substantially vertical transport axis and about a pivot axis oriented substantially horizontal and perpendicular to the wing roller axis;

right and left bracket locks operative when engaged to lock the respective wing bracket with respect to the bracket axis to prevent rotation of the wing bracket about the bracket axis;

right and left transport actuators operative to move said right and left center wheels down such that, when said bracket locks are engaged, right and left wing brackets move up to a transport position;

right and left wing wheels movable from a raised operating position above the ground to a lowered transport position supporting corresponding right and left wings above the ground;

wherein the right and left wings are movable from an operating position with the center and wing rollers resting on the ground, and extending laterally from corresponding right and left wing brackets such that the wing roller axes are substantially perpendicular to the operating travel direction and such that inner ends of said right and left wing rollers are rearward of and overlap corresponding right and left ends of the center roller, to the transport position with the center and wing rollers supported above the ground and where the right and left wings extend rearward from the corresponding right and left wing brackets such that the wing roller axes are substantially aligned with the operating travel direction;

wherein each wing comprises:
an inner wing frame pivotally mounted at an inner end thereof to the corresponding wing bracket, and an inner roller rotatably mounted to the inner wing frame about an inner roller axis;
an outer wing frame pivotally mounted, about a wing pivot axis oriented substantially horizontally and perpendicular to the inner roller axis, to an outer end of the inner wing frame, and an outer roller rotatably mounted to the outer wing frame about an outer roller axis;
wherein the inner and outer rollers are substantially aligned and wherein adjacent ends of the inner and outer rollers are separated by a roller spacing;
an overlap frame attached to a rear portion of one of the inner and outer wing frames, and an overlap roller rotatably mounted to the overlap frame about an overlap roller axis, the overlap roller oriented to roll over the roller spacing, and wherein the overlap roller has a diameter that is less than a diameter of the inner and outer rollers; and
a wing lock operative, when the wing is in the transport position, to lock the inner and outer wing frames in an aligned position where the inner and outer roller axes are substantially aligned;
wherein the overlap roller rests on the ground when the apparatus is in the operating position, and wherein when the apparatus is in the transport position the overlap roller is supported above the ground; and
wherein in the transport position, right and left overlap rollers are laterally aligned with, and adjacent to, each other when moving in a substantially straight line in the operating travel direction; and wherein during a turn, the right and left wings pivot with respect to the center frame about the vertical transport pivot axes such that a distance between the right and left wings is reduced, and such that the right and left overlap rollers move forward and rearward to offset positions with respect to each other such that the right and left overlap rollers can move toward the corresponding opposite right and left wings.

2. The apparatus of claim 1 wherein the wings are aligned behind the center section when in the transport position, such that a width of the apparatus when in the transport position is substantially equal to a width of the center section.

3. The apparatus of claim 1, wherein at least one transport actuator comprises an extendable actuator operative to move an over-centering link connected between the corresponding center wheel and the corresponding wing bracket.

4. The apparatus of claim 1 wherein at least one overlap frame is mounted to one of the inner or outer wing frames about a pivot axis oriented substantially parallel to an axis of a roller mounted to the inner or outer wing frame such that the attached overlap roller can move up over an obstruction.

5. The apparatus of claim 4 comprising a lower stop such that when the inner or outer wing is raised to the transport position the attached overlap roller is raised above the ground.

6. The apparatus of claim 5 comprising a bias element operative to exert a downward bias force on the at least one overlap frame.

7. The apparatus of claim 1 wherein the each wing wheel is pivotally mounted to an outer location on the corresponding outer wing frame about a substantially vertical wheel pivot axis and comprising a wheel actuator operative to pivot the wing wheel about the wheel pivot axis.

8. The apparatus of claim 1 wherein each wing comprises an extension wing frame pivotally mounted at an inner end thereof, about a wing pivot axis oriented substantially horizontally and perpendicular to the outer roller axis, to an outer end of the outer wing frame, and an extension roller rotatably mounted to the extension wing frame about an extension roller axis;
wherein the inner, outer, and extension rollers are substantially aligned and wherein adjacent ends of the outer and extension rollers are separated by an extension roller spacing;
wherein the wing lock is operative, when the wing is in the transport position, to lock the inner, outer, and extension wing frames in an aligned position where the inner, outer, and extension roller axes are substantially aligned; and
an extension overlap frame attached to a rear portion of one of the outer and extension wing frames, and an extension overlap roller rotatably mounted to the extension overlap frame about an extension overlap roller axis, the extension overlap roller oriented to roll over the extension roller spacing.

9. The apparatus of claim 8 wherein each wing wheel is pivotally mounted to an outer location on the corresponding extension wing frame about a substantially vertical wheel pivot axis and comprising a wheel actuator operative to pivot the wing wheel about the wheel pivot axis.

10. A land roller implement apparatus comprising:
a center section comprising a center frame, a hitch at a front end of the center frame adapted for attachment to a towing vehicle, and a center roller rotatably mounted to the center frame about a center roller rotational axis oriented substantially perpendicular to an operating travel direction;
center wheels mounted on the center frame and movable from a raised operating position to a lowered transport position supporting the center roller above the ground for movement in the operating travel direction;

right and left wings pivotally mounted to corresponding right and left sides of the center section, each wing comprising:
an inner wing frame pivotally mounted at an inner end thereof to a corresponding side of the center frame, and an inner roller rotatably mounted to the inner wing frame about an inner roller axis;
an outer wing frame pivotally mounted, about a wing pivot axis oriented substantially horizontally and perpendicular to the inner roller axis, to a corresponding end of the inner wing frame, and an outer roller rotatably mounted to the outer wing frame about an outer roller axis;
wherein the inner and outer rollers are substantially aligned and wherein adjacent ends of the inner and outer rollers are separated by a roller spacing;
an overlap frame attached to a rear portion of one of the inner and outer wing frames, and an overlap roller rotatably mounted to the overlap frame about an overlap roller axis, the overlap roller oriented to roll over the roller spacing, and wherein the overlap roller has a diameter that is less than a diameter of the inner and outer rollers;
a wing wheel movable from a raised operating position above the ground to a lowered transport position supporting the wing above the ground; and
a wing lock operative, when the wing is in the transport position, to lock the inner and outer wing frames in an aligned position where the inner and outer roller axes are substantially aligned;
wherein the right and left wings are movable from an operating position with the rollers resting on the ground, where the right and left wings extend laterally from the corresponding right and left ends of the center frame such that the inner, outer, and overlap roller axes are substantially perpendicular to the operating travel direction and such that inner ends of the right and left inner rollers are rearward of and overlap corresponding right and left ends of the center roller, to a transport position with the rollers supported above the ground where the right and left wings extend rearward from the corresponding right and left ends of the center frame such that the inner, outer, and overlap roller axes are substantially aligned with the operating travel direction;
where in the transport position right and left overlap rollers are laterally aligned with, and adjacent to, each other when moving in a substantially straight line in the operating travel direction; and wherein during a turn, the right and left wings pivot with respect to the center frame about substantially vertical transport pivot axes such that a distance between the right and left wings is reduced, and such that the right and left overlap rollers move forward and rearward to offset positions with respect to each other such that the right and left overlap rollers can move toward the corresponding opposite right and left wings.

11. The apparatus of claim 10 wherein at least one overlap frame is mounted to one of the inner or outer wing frames about a pivot axis oriented substantially parallel to an axis of a roller mounted to the inner or outer wing frame such that the attached overlap roller can move up over an obstruction.

12. The apparatus of claim 11 comprising a lower stop such that when the inner or outer wing is raised to the transport position the attached overlap roller is raised above the ground.

13. The apparatus of claim 12 comprising a bias element operative to exert a downward bias force on the at least one overlap frame.

14. The apparatus of claim 10 wherein:
the center frame comprises right and left wing brackets extending rearward from corresponding right and left locations on the center frame, wherein each wing bracket is pivotally attached at a front end thereof to the center frame about a bracket axis oriented substantially horizontal and perpendicular to the operating travel direction;
a right center wheel is movably mounted under the right wing bracket and a left center wheel is movably mounted under the left wing bracket; and
a right wing and a left wing are pivotally mounted to corresponding wing brackets about a substantially vertical transport axis and about a pivot axis oriented substantially horizontal and perpendicular to the wing roller axis.

15. The apparatus of claim 14 comprising right and left bracket locks operative when engaged to lock the corresponding wing brackets with respect to the bracket axis to prevent rotation of the corresponding wing bracket about the bracket axis, and right and left transport actuators operative to move right and left center wheels down such that, when the bracket locks are engaged, right and left wing brackets move up to a transport position and raise the center roller and inner ends of the wings up to the transport position.

16. The apparatus of claim 10 wherein the wing wheel is pivotally mounted to an outer location on the outer wing frame about a substantially vertical wheel pivot axis, and comprising a wheel actuator operative to pivot the wing wheel about the wheel pivot axis.

17. The apparatus of claim 10 wherein each wing comprises
an extension wing frame pivotally mounted, about a wing pivot axis oriented substantially horizontally and perpendicular to the outer roller axis, to a corresponding end of the outer wing frame, and an extension roller rotatably mounted to the extension wing frame about an extension roller axis;
wherein the inner, outer, and extension rollers are substantially aligned and wherein adjacent ends of the outer and extension rollers are separated by an extension roller spacing;
wherein the wing lock is operative, when the wing is in the transport position, to lock the inner, outer, and extension wing frames in an aligned position where the inner, outer, and extension roller axes are substantially aligned; and
an extension overlap frame attached to a rear portion of one of the outer and extension wing frames, and an extension overlap roller rotatably mounted to the extension overlap frame about an extension overlap roller axis, the extension overlap roller oriented to roll over the extension roller spacing.

18. The apparatus of claim 17 wherein the wing wheel is pivotally mounted to an outer location on the extension wing frame about a substantially vertical wheel pivot axis, and comprising a wheel actuator operative to pivot the wing wheel about the wheel pivot axis.

* * * * *